United States Patent [19]
Tanabe et al.

[11] Patent Number: 5,259,107
[45] Date of Patent: Nov. 9, 1993

[54] MICROJOINT SEPARATION APPARATUS

[75] Inventors: Toshiyuki Tanabe; Yasuo Harada; Norio Hashimoto, all of Komatsu, Japan

[73] Assignee: Kabushiki Kaisha Komatsu Seisakusho, Tokyo, Japan

[21] Appl. No.: 976,271

[22] Filed: Nov. 13, 1992

[51] Int. Cl.⁵ .............................................. B23P 19/04
[52] U.S. Cl. .................... 29/564.6; 29/565; 29/566.1; 225/105
[58] Field of Search ............... 29/412, 413, 414, 426.4, 29/426.5, 565, 564.6, 566.1, 26 A; 225/97, 103, 104, 105; 408/3, 42, 50

[56] References Cited
U.S. PATENT DOCUMENTS
3,090,261  5/1963  Hill ............................................ 408/3
5,067,229  11/1991  Nakamura .................................... 409/229

FOREIGN PATENT DOCUMENTS
61-159121  10/1986  Japan .

*Primary Examiner*—Mark Rosenbaum
*Assistant Examiner*—Kenneth J. Hansen
*Attorney, Agent, or Firm*—Richards, Medlock & Andrews

[57] ABSTRACT

A tapping function is imparted to a microjoint separation apparatus in order to obtain uniform cycle time and to improve productivity. The apparatus includes: grips (6) for moving a workpiece (2) in the X-axial direction of the main body (1) of the apparatus; a hammer (30) and a tapping unit (40) provided on the main body (1) and movable in a Y-axial direction perpendicular to the X-axial direction; an NC device (35) for positioning tapping point and hammering point of the workpiece (2) by moving the grips (6), the hammer (30) and the tapping unit (40) in X-Y axial directions; and cradles (31, 32) for selectively supporting a lower portion of the workpiece (2) during the hammering operation and the tapping operation.

21 Claims, 13 Drawing Sheets

FIG. I

F I G. 8A
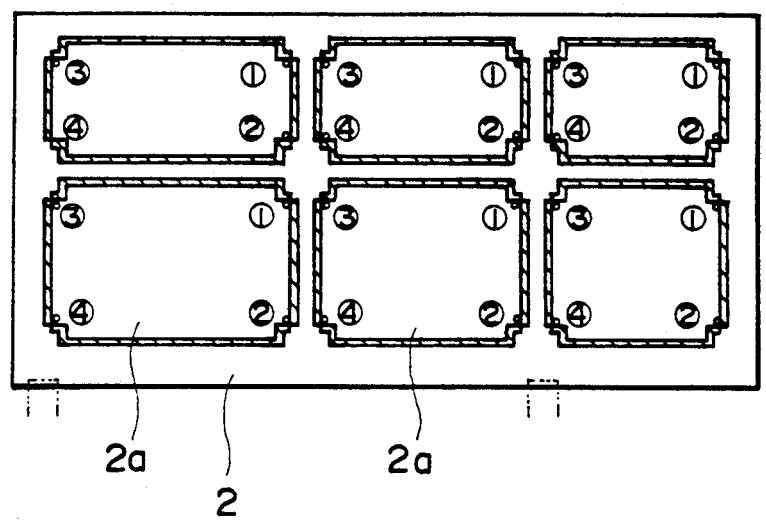
F I G. 8B
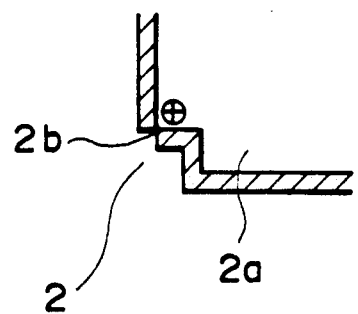

F I G. 10
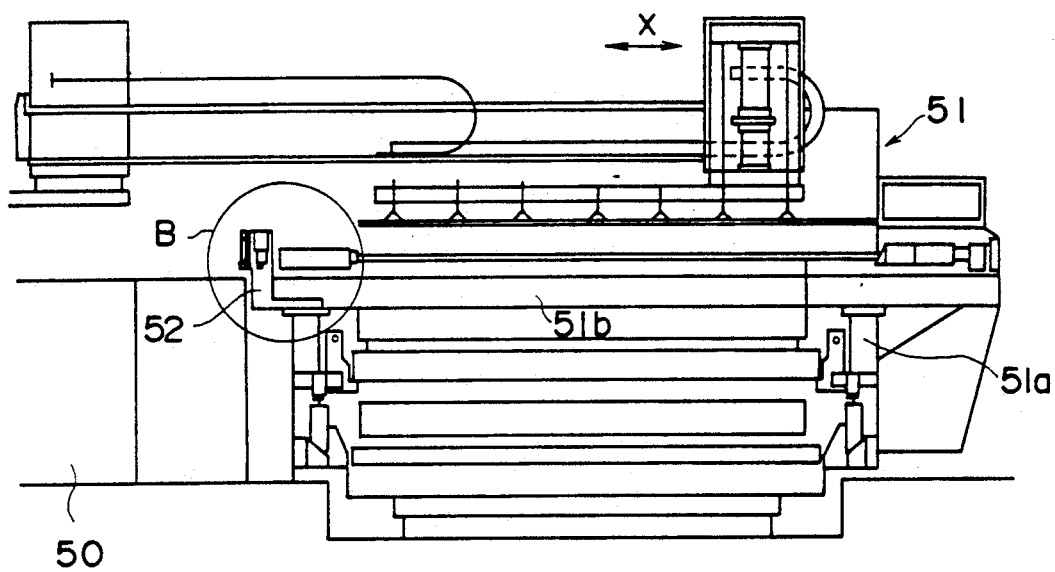

MICROJOINT SEPARATION APPARATUS

BACKGROUND OF THE INVENTION

1. Field of the Invention

The present invention relates to microjoint separation apparatus for separating a product which has been processed with a microjoint. In one aspect the invention relates to a separation apparatus for separating a product which has been processed with a microjoint and then subjected to a tapping process.

2. Description of the Related Art

A microjoint is a weakened line of severance in a workpiece which is suitable for temporarily holding a product within the frame of the workpiece during the fabrication of the product, while subsequently permitting an easy separation of the product from the frame. A microjoint can have any suitable form, e.g. a continuous line of substantially reduced thickness in comparison to the remainder of the workpiece thickness or a line of complete separation interrupted by occasional strips of joinder. Such joinder strips can be in any suitable form, e.g. flat strips, threads, wires, etc., and can have a thickness which is the same as or less than the thickness of the workpiece frame.

A method of producing a large number of individual products from a plate-like workpiece using a sheet metal working machine, e.g. a turret punch press or a laser beam machine, has been known in which the working is performed in the state where the workpiece and a product contained therein are connected by a microjoint. After such working, the product is separated from the remainder of the workpiece at the microjoint or wire joint. Further, when tapping is to be performed on a product which has been produced by microjoint processing, a tapping device can be provided on the sheet metal working machine to perform such tapping after the microjoint processing and before the separation.

However, when such tapping device is provided, a large difference results between the cycle time necessary for the tapping operation after such microjoint processing and the cycle time necessary for a microjoint separation apparatus to separate the product from the remainder of the workpiece at the microjoint. If a system is constructed by setting a microjoint separation apparatus on the downstream side of the sheet metal working apparatus, a problem occurs in that productivity is greatly reduced as the line balancing is worsened.

Apparatus for separating a product processed with microjoints from the remainder of the workpiece has been known, e.g. the apparatus disclosed in Japanese Utility Model Laid-Open Publication No. 61-159121. Such an apparatus is provided with a plurality of rotating hammers, and the workpiece is struck by these hammers in the vicinity of the microjoint in order to separate the product from the remainder of the workpiece.

However, the hammers in such separating apparatus may not accurately strike the vicinity of a microjoint, depending on the type of product to be processed, resulting in a problem that the apparatus is susceptible to an error in the separation process.

In one conventional method a punch, used exclusively for the purpose of separating a microjoint, is provided within a sheet metal working machine in order to separate the microjoint immediately after the completion of the working of the product. In another conventional method a punch and die unit, for separating along a microjoint, is provided above a workpiece holding table, with the punch and die unit travelling in the transverse direction of the workpiece; and the separating position is determined by moving the workpiece in the direction orthogonal to the punch and die unit.

However, the method of providing a punch, exclusively for separation, within the sheet metal working apparatus is not easy to be implemented because it requires a large modification of a machine body. Further, there is also a problem in that the apparatus as a whole becomes expensive. For example, a large scale sending-out or delivery device can be required in order to discriminate between the workpiece frame and the product, due to the fact that the frame and the separated product remain on the same worktable.

On the other hand, the punch and die unit method causes a problem in that it requires a large space for the installation of the punch and die unit, and the apparatus as a whole becomes expensive since a worktable must be provided exclusively for the separation of the microjoint.

SUMMARY OF THE INVENTION

It is an object of the present invention to provide for the accurate separation of a product which has been processed with microjoints. To this end, a microjoint separation apparatus in accordance with a first embodiment of the present invention comprises: a grip for moving, in the X-axis direction, a workpiece which has been introduced to the upstream side of the main body of the apparatus; an impact imparting device provided on the main body and movable in a Y-axial direction which is orthogonal to the X-axial direction; a control device for determining the position of impact on the workpiece by moving and controlling the grip and the impact imparting device in the X-Y directions; and a cradle for supporting the workpiece from the lower portion thereof during the impacting operation.

Since it is possible with such construction to accurately position the impact imparting device in the vicinity of the microjoint connecting the product to the frame, i.e., the remainder of the workpiece, in order to separate the product from the frame along the microjoint, the positioning error in the separation process can be prevented.

It is an object of the present invention to achieve uniform cycle time and improved productivity with a microjoint separation apparatus. Another object of the invention is to make tapping possible at the side of a microjoint separation apparatus. To these ends, a microjoint separation apparatus in accordance with a second embodiment of the present invention comprises: a grip for moving, in the X-axis direction, a workpiece which has been introduced to the upstream side of the main body of the microjoint separation apparatus; an impact imparting device and a tapping device provided on the body and movable in a Y-axis direction, which is orthogonal to the X-axis; a control device for determining a tapping position and an impacting position of the workpiece by moving the grip, the tapping device and the impact imparting device in the X-Y axial directions; and a cradle for supporting the workpiece from the lower portion thereof during the tapping operation and during the impacting operation.

Since it is possible with such construction to use the impact imparting device to accurately separate the microjoint after the performance of the tapping operation by a numerically controlled tapping device, the cycle time of the process can be made uniform with respect to the cycle time of the sheet metal working machine. Thus, the line balancing of the system can be improved and a higher productivity can be achieved.

It is a further object of the present invention to provide an efficient separation of a microjoint with an inexpensive apparatus. To this end, a microjoint separation apparatus in accordance with a third embodiment of the present invention comprises: a main beam movable in an X-axis direction, which is parallel to the feeding direction of the workpiece, provided on a sheet material supply device for carrying the workpiece to the sheet metal working machine, and an impact imparting unit movable in a Y-axis direction, which is orthogonal to the X-axis, provided on the main beam. In addition, two dies, which are parallel to each other and to the Y-axial direction, are provided at a position below the impact imparting unit in a manner so as to be selectively movable in a vertical direction in accordance with the position of the product to be separated. The microjoint of the workpiece is separated at a position between a impact imparting element, such as a punch, provided on the impact imparting unit, and one of the dies.

With such construction, a workpiece having microjoints can be processed in a sheet metal working machine and then can be separated into a product and a frame by the microjoint separation apparatus which is provided on a sheet metal supply device. It is also possible to collect products and frames separately by providing a storage device.

In each of these embodiments of the invention, each of the X-axis and the Y-axis will generally be at least substantially horizontal, but can be inclined to the horizontal at an acute angle. Preferably the control device is a numerical control (NC) device.

BRIEF DESCRIPTION OF THE DRAWINGS

FIG. 8A is a top view of a workpiece processed with microjoints;

FIG. 8B is an enlarged view of the microjoint portion;

FIG. 10 is a front view of a sheet material supply unit provided with a microjoint separation device according to a third embodiment of the present invention;

DESCRIPTION OF THE PREFERRED EMBODIMENTS

Figure 1:
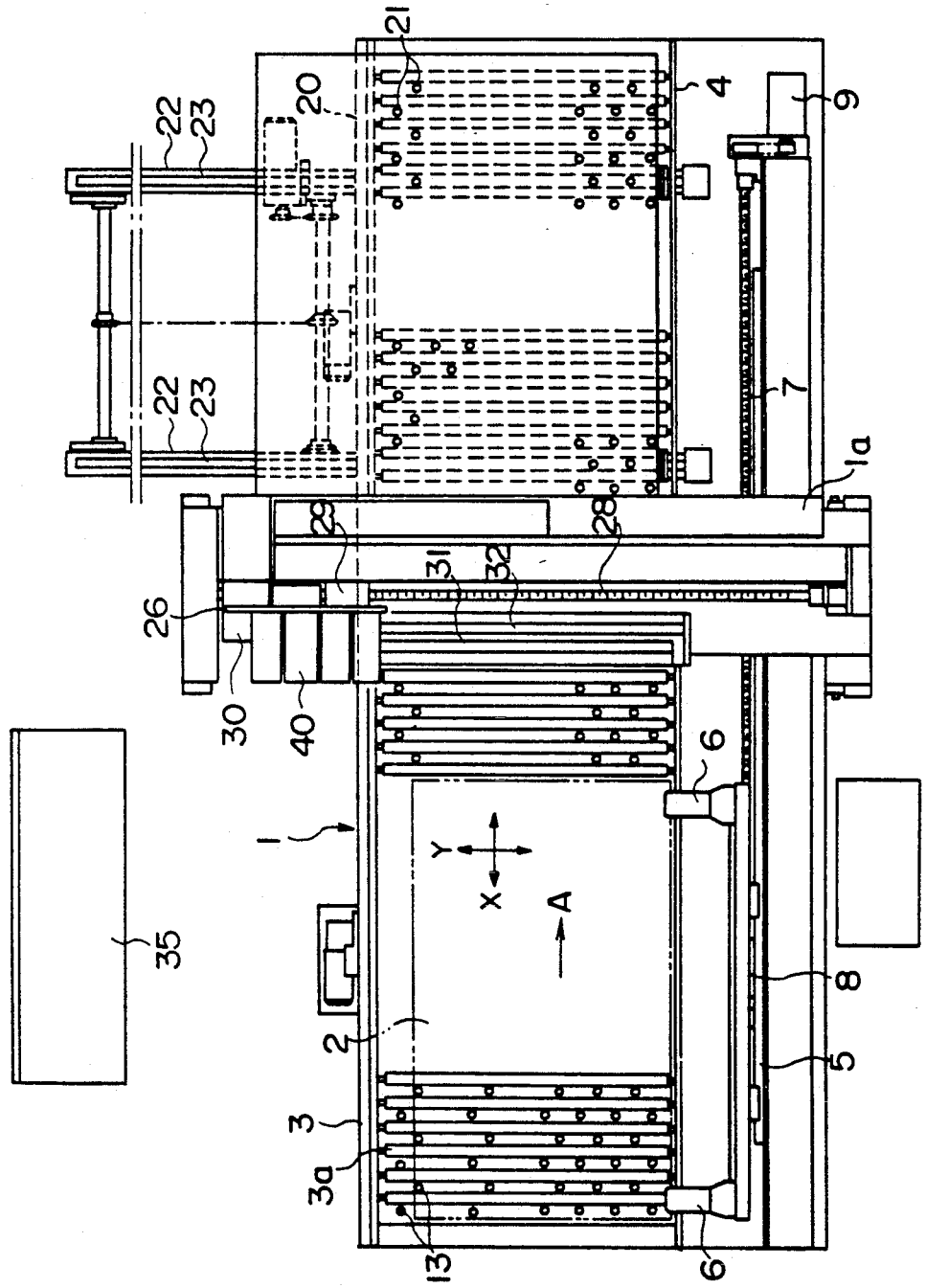
FIG. 1 is a top view of a microjoint separation apparatus according to first and second embodiments of the present invention.

A detailed description of a first embodiment of the present invention will now be described with reference to the drawings.

Referring to FIGS. 1 to 4, the main body of a microjoint separation apparatus 1 supports roller conveyors 3, 4 for carrying a workpiece 2 at the upstream side and the downstream side, respectively, of the apparatus 1, with the upstream side and the downstream side being aligned with respect to the workpiece carrying direction (arrow A). Conveyor 3 is driven by driver motor 3b, while conveyor 4 is driven by driver motor 4a. A guide rail 5 is provided on the same side of each of the roller conveyors 3, 4. The grips 6 for grasping the workpiece 2 are supported on the guide rail 5 so as to be movable in the workpiece carrying direction A.

On the side of the guide rail 5 toward the roller conveyors 3, 4, a ball thread shaft 7 is supported so as to be parallel to the guide rail 5. A ball rut 8 provided on the grips 6 meshes with the ball thread shaft 7. Thus, the grips 6 can be moved in the X-axial direction (workpiece carrying direction A) by rotating the ball thread shaft 7 with an X-axis servomotor 9 which is provided at the downstream end of the guide rail 5. Servomotor 9 is preferably a bidirectional motor.

An elevator table 12 is provided below the roller conveyor 3, which is provided on the upstream side of the main body 1. A large number of free bearings 13 are provided on the upper surface of the elevator table 12 so that each of them is positioned between a respective pair of rollers 3a of the roller conveyor 3. An elevator mechanism 14 is provided at the lower side of the elevator table 12. The elevator mechanism 14 has several links 14a, each of which is formed into the shape of an inverted "L" with the elbow portion thereof being rotatably supported on a stand 16 by means of a pin 15. The upper end of each of the links 14a is attached to the lower surface of the elevator table 12.

Figure 2:
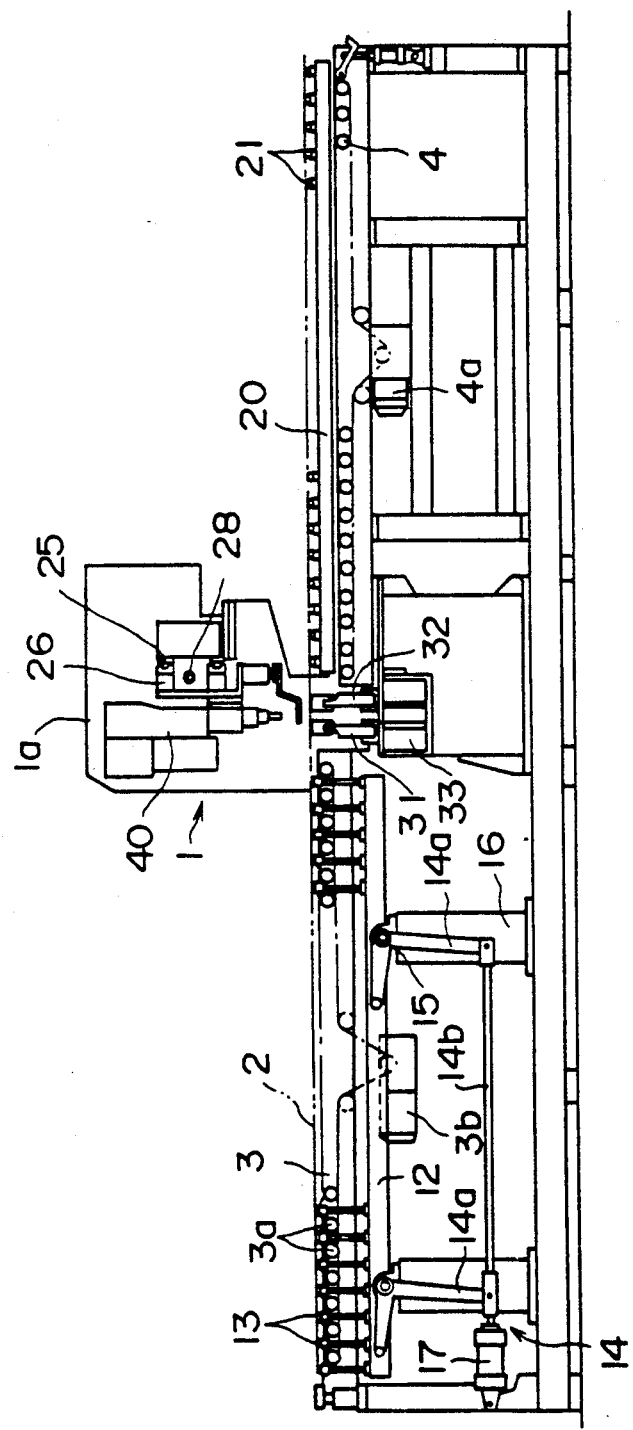
FIG. 2 is a front view of the apparatus of FIG. 1.
Figure 5:
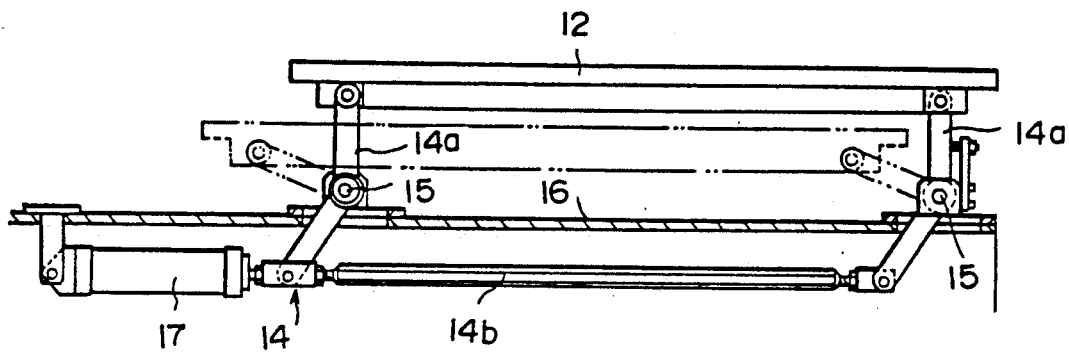
FIG. 5 shows details of the elevator mechanism of the apparatus of FIG. 1.

The lower ends of the links 14b are connected to each other by a linking rod 14b. One end of the linking rod 14b is connected to an elevator cylinder 17. Each link 14a is rotated about the respective pin 15 by means of the elevator cylinder 17 so that, as shown in FIG. 5, the elevator table 12 can be raised from the lowered position indicated by the dashed line to the higher or elevated position indicated by the solid line. In the elevated position of elevator table 12, the free bearings 13 provided on the upper surface of the elevator table 12 project upwardly above the roller conveyor 3, as shown in FIG. 2.

On the other hand, the roller conveyor 4 provided on the downstream side of the main body 1 is mounted so as to be lower than the upstream roller conveyor 3 by a certain amount. A translation table 20 is movable above the roller conveyor 4 in the Y-axial direction, which is orthogonal to the workpiece carrying direction A. A large number of free bearings 21 are provided on the upper surface of the translation table 20 so that their bearing surfaces are in the same horizontal plane as that of the free bearings 13 provided on the upper surface of the elevator table 12 when it is at its elevated position.

Stands 22 are positioned on one side of the downstream roller conveyor 4 so as to extend in the Y-axis direction. The translation table 20 is supported on guide rails 23, which are provided on the stands 22, so as to be movable in the Y-axial direction between its extended or use position above the downstream roller conveyor 4 and its retracted or waiting position above the stands 22 and away from the downstream roller conveyor 4. The translation table is moved between its extended and retracted positions by a translation table motor 24, which is attached to the stands 22. Translation table motor 24 is preferably bidirectional.

The main body 1 has the appearance of a reciprocatable gate positioned between the upstream roller conveyor 3 and the downstream roller conveyor 4. A pair of vertically spaced apart guide rails 25 extend in the Y-axial direction on a side surface of the upper frame 1a which traverses the workpiece carrying direction A. A carrier 26 is moveably attached to the guide rails 25. A ball thread shaft 28, which can be rotated by a Y-axial servomotor 27, is provided between the guide rails 25. A ball nut 29 provided on the carrier 26 is threaded onto the ball thread shaft 28 so that the carrier 26 can be moved in the Y-axial direction by rotating the ball thread shaft 28 by means of the bidirectional Y-axial servomotor 27.

Figure 6:
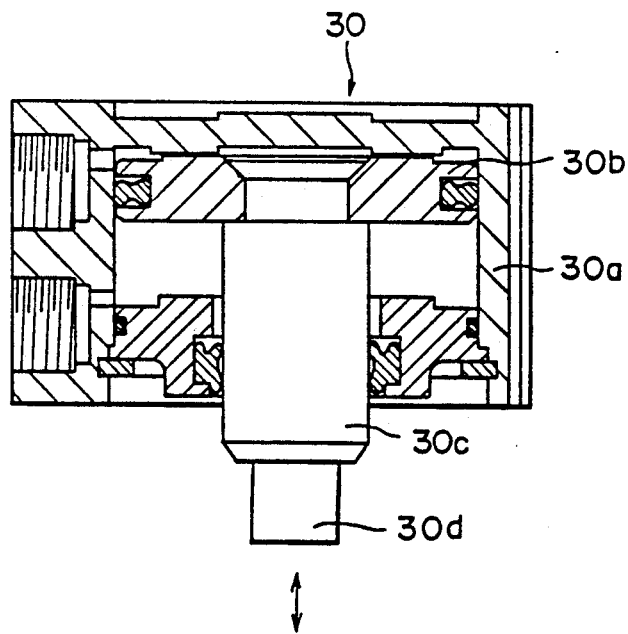
FIG. 6 is an enlarged cross-sectional view of a hammer.

At least one impact imparting device, e.g. hammer 30, is attached to carrier 26 for movement therewith in the Y-axial direction. As shown in FIG. 6, the hammer 30 comprises an air cylinder 30a. A striking element 30d, formed of an elastic material such as urethane, is attached to the terminal end of a piston rod 30c which projects downwardly from a piston 30b accommodated within the air cylinder 30a. Thus, the striking element 30d can be reciprocated in the vertical or Z-axial direction by the piston 30b in order to impart an impact to the workpiece 2. Two cradles 31, 32, which are provided below the hammer 30, extend in a Y-axial direction which is orthogonal to the workpiece carrying direction A. The upstream cradle 31 and the downstream cradle 32 can be moved vertically or in the Z-axial direction, either simultaneously or singly by selection. The Z-axial direction is preferably at least generally perpendicular to the X-axis and the Y-axis, but can be inclined to the vertical at an acute angle.

In preparation for the microjoint separation, the workpiece 2 is positioned by grips 6 such that the microjoint to be separated is located above and between cradles 31, 32, with cradle 31 being positioned below a portion of the workpiece 2 upstream of the microjoint to be separated and cradle 32 being positioned below a portion of the workpiece 2 downstream of the microjoint to be separated.

Figure 9A:
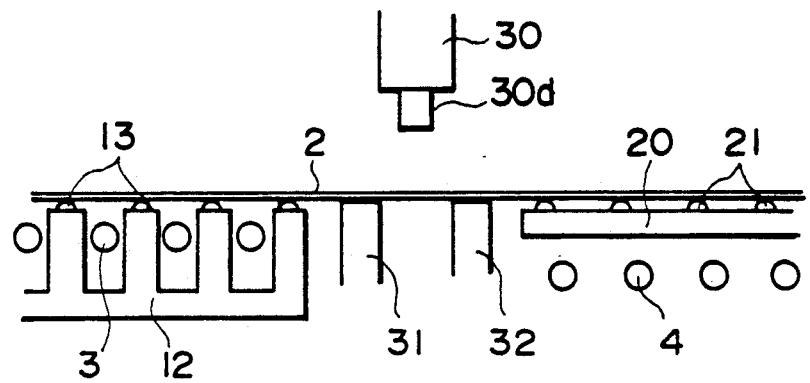
FIG. 9A, FIG. 9B and FIG. 9C show the separation operation.

The operation of the first embodiment will now be described. When a workpiece 2, which has been processed with microjoints by a sheet metal working machine (not shown), is introduced by the upstream roller conveyor 3, the elevator table 12 is raised so that the free bearings 13 on the elevator table 12 support the workpiece 2 from the lower side thereof and the grips 6 grasp an edge of the workpiece 2. At this time, the translation table 20 is positioned above the downstream roller conveyor 4, as shown in FIG. 9A, with the free bearings 21 mounted on the translation table 20 providing a bearing surface plane for the workpiece 2 which is at least substantially coplanar with the bearing surface plane provided by free bearings 13 which are mounted on the elevator table 12.

Figure 9B:
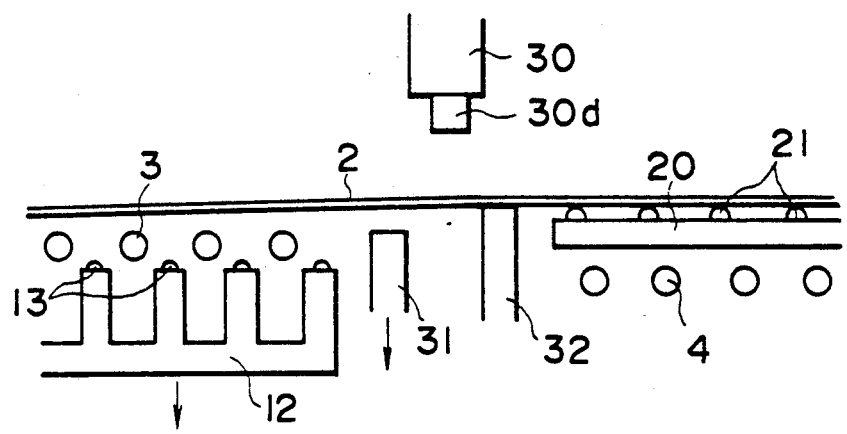

The NC device 35, on the basis of the data previously inputted thereto, causes the grips 6 to move the workpiece 2 in the X-axial direction and causes the carrier 26 to move in the Y-axial direction so that the hammering points of the workpiece 2 are sequentially positioned below the hammer 30. That is, in the case where the workpiece 2 processed with microjoints is one as shown in FIG. 8A, the hammering order is previously inputted to the NC device 35, so that, for example, the downstream hammering point ① of the workpiece 2 is first positioned. At this time, the elevator table 12 and the cradle 31 at the upstream side are lowered, as shown in FIG. 9B, leaving ah upstream portion of the workpiece 2 unsupported by either bearings 13 or cradle 31 while a downstream portion of the workpiece 2 is supported by the bearings 21 on the translation table 20 and by downstream cradle 32. Of course, the frame 2a is also supported by grips 6.

In this state, air is supplied to the air cylinder 30a of the hammer 30 to drive the piston 30b at least substantially vertically downwardly. The striking element 30d attached to the terminal end of the piston rod 30c strikes the hammering point ① (see FIG. 8A) in the vicinity of the microjoint 2b connecting the workpiece 2 and the product 2a, as shown in FIG. 8B, and then this operation is repeated for the downstream hammering point ②, to thereby separate the downstream microjoint 2b.

By repeating such operation as necessary for additional hammering points on a given product 2a, the product 2a can be completely separated from the remainder of the workpiece 2, which has been carried in by the upstream roller conveyor 3, and the separated product 2a can be discharged by the downstream roller conveyor 4.

Figure 9C:
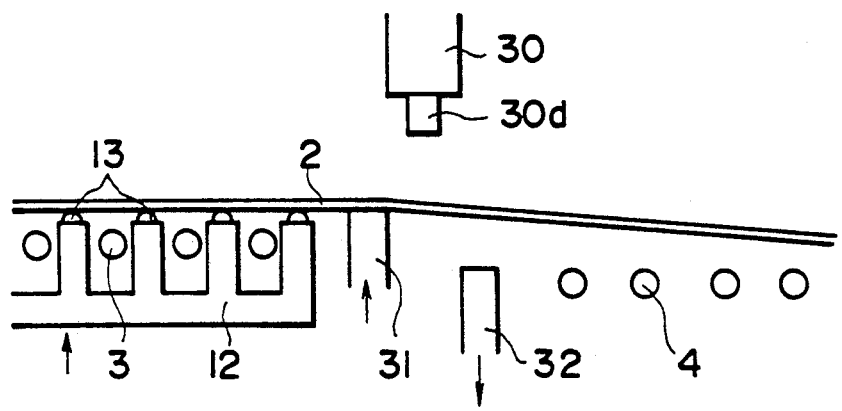

For example, with the workpiece 2 of FIG. 8A, when either of the upstream hammering points ③, ④ of the workpiece 2 is positioned beneath the hammer 30, the elevator table 12 and the upstream cradle 31 are raised to their elevated, supporting positions, as shown in FIG. 9C. The translation table 20 at the downstream side is retracted in the Y-axial direction and the cradle 32 is lowered to its retracted position, leaving a downstream portion of the workpiece 2 which includes the particular product 2b unsupported by either bearings 21 or cradle 32 while the frame 2a of the workpiece 2 is supported by the bearings 13 on the elevator table 12 and by grips 6. In this position, the striking element 30d of the hammer 30 strikes the hammering point ③, and then the hammering point ④ to separate the upstream microjoint 2b. When the last microjoint connection for a particular product 2a is broken so that the product 2a is completely separated from the remainder of the workpiece 2, the separated product 2a falls onto downstream roller conveyor 4 while the remainder of the workpiece 2 is still supported by the grips 6. The separated product 2a is delivered out of the apparatus by the downstream roller conveyor 4.

According to the first embodiment, it is possible to accurately cut a microjoint, since the microjoint is separated by the hammer in the state where the hammering points of the workpiece are positioned by an NC device. Thereby, the occurrence of an error in separation can be securely prevented. In addition, it can be widely used, since inputting of the product data to the NC device suffices even if the shape of the product to be separated at the microjoint is variously changed. It is possible to employ a plurality of impact imparting devices 30 on a single threaded shaft 28 where the spacing between the hammering points in the Y-axial direction is the same for a series of identical products.

A second embodiment of the present invention will now be described. Components of the second embodiment which are identical to components of the first embodiment are denoted by the same reference numerals, and the description thereof is not repeated.

Figure 3:
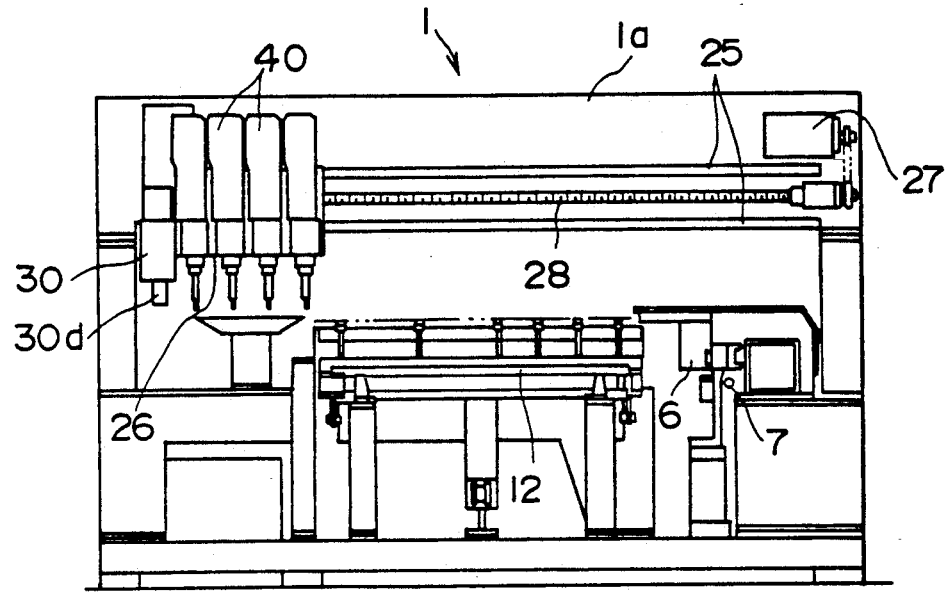
FIG. 3 is a left side view of the apparatus of FIG. 1.
Figure 4:
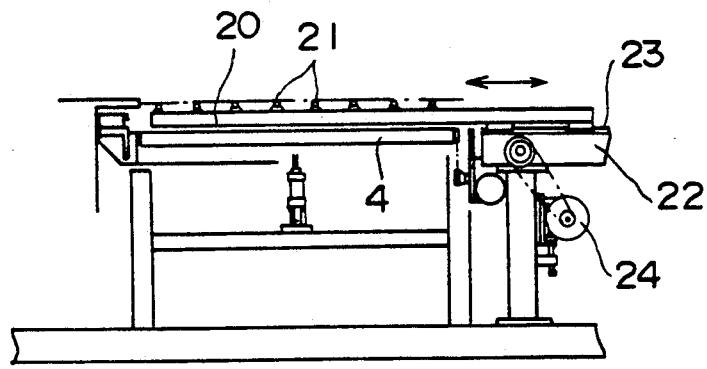
FIG. 4 is a right side view of the apparatus of FIG. 1.

A carrier 26 is moveably attached to the guide rails 25 of the main body 1 of the microjoint separation apparatus, as shown in FIGS. 1 to 3, and a single impact imparting device, e.g. hammer 30, and a plurality of tapping devices 40 are attached to the carrier 26 for movement in the Y-axial direction. The two cradles 31, 32 are positioned below the hammer 30 and the tapping devices 40.

Figure 7:
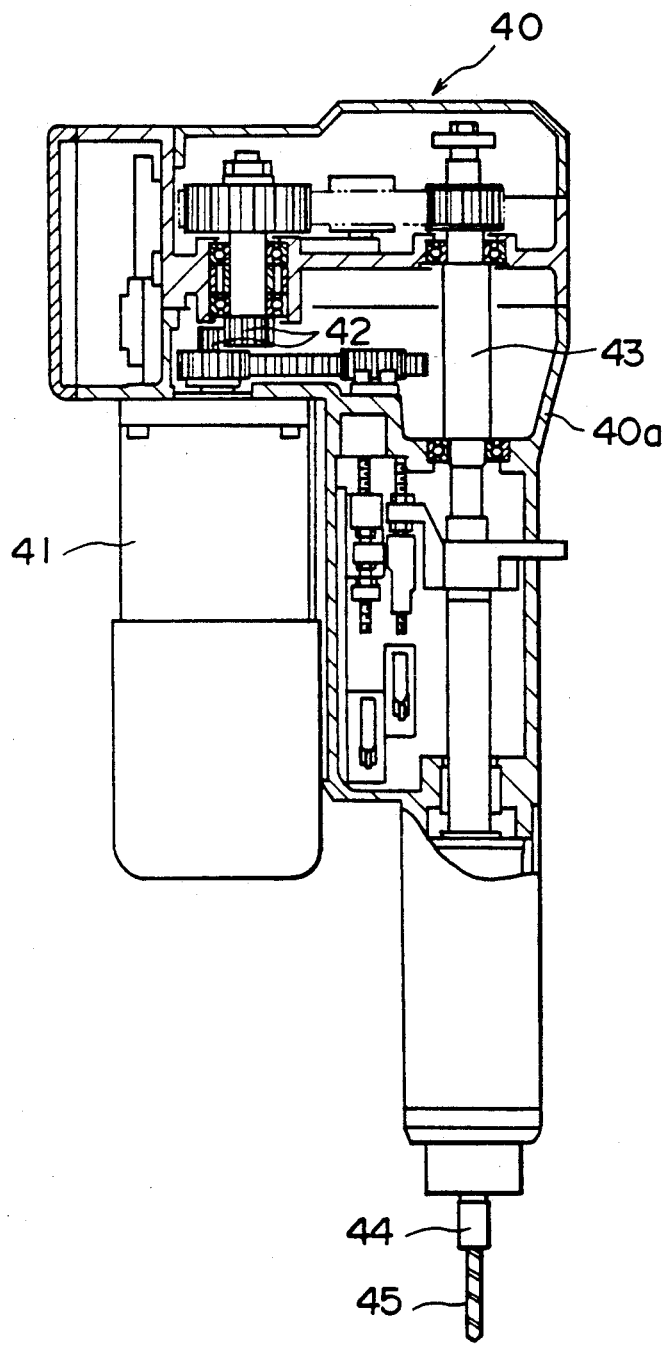
FIG. 7 is an enlarged cross-sectional view of a tapping device.

As shown in FIG. 7, a tapping device 40 is constructed such that a tapping motor 41 is attached to the, side of a case 40a so that a tapping shaft 43 is rotated by the tapping motor 41 via a reduction gear 42 positioned within the case 40a. The lower end of the tapping shaft 43 projects downwardly from the case 40a and has a chuck 44 provided at the distal end thereof, a tap 45 being attached to the chuck 44.

The operation of the second embodiment will now be described. A workpiece 2 processed with microjoints by a sheet metal working machine (not shown) is carried in by the upstream roller conveyor 3. The elevator table 12 is then raised so that the free bearings 13 on the elevator table 12 support the workpiece 2 from the lower side thereof and the grips 6 grasp one edge of the workpiece 2. At this time, the translation table 20 is positioned, as shown in FIG. 9A, above the downstream roller conveyor 4 so that the NC device 35, on the basis of the data previously inputted to the thereto, can cause the grips 6 to move the workpiece 2 in the X-axial direction and cause the carrier 26 to move in the Y-axial direction so that the tapping points of the workpiece 2 are sequentially positioned below the tapping device 40.

In this state, the portions of the product 2a which are to be tapped are first tapped sequentially by the tap 45. After completion of such tapping process, the grips 6 are moved in the X-axial direction and the carrier 26 is moved in the Y-axial direction by the NC device 35 to any extent necessary so that the portion of the workpiece 2 which is to be hammered is positioned below the hammer 30. In this state, the hammer 30 strikes the vicinity of the microjoint connection between the workpiece frame 2b and the product 2a so as to break the microjoint connection. The product 2a, thus separated from the workpiece frame 2b, is then removed from the apparatus by the downstream roller conveyor 4.

By repeating this operation, it is possible to perform tapping on a plurality of products 2a contained within a workpiece 2, introduced by the upstream roller conveyor 3, and then to separate the products 2a and send them out by the delivery roller conveyor 3, while retaining the remaining frame of the workpiece 2 in the separation apparatus.

According to the second embodiment, the waiting time for the separation of microjoint is less, and a uniform cycle time can be obtained, when compared to the situation wherein the tapping is performed by a conventional sheet metal working machine, since the tapping of the product can also be performed at the time of separating the microjoint. Thus, an improvement in the productivity can be achieved. Further, an X-Y driver system, controlled in the X-Y axial directions by an NC device, can be used for both the tapping device and the hammer. Thus, the construction is simpler and less expensive, compared to the situation wherein a separate driver system is provided for each of the tapping device and the hammer.

A third embodiment of the present invention will now be described in detail with reference to the drawings.

Referring to FIG. 10, a sheet material supply device 51 supplies a plate-like workpiece 65 to a sheet metal working machine 50, and a microjoint separation apparatus 52 is provided on the device 51. The microjoint separation apparatus 52 employs a punch unit 62 as the impact imparting device.

Figure 11:
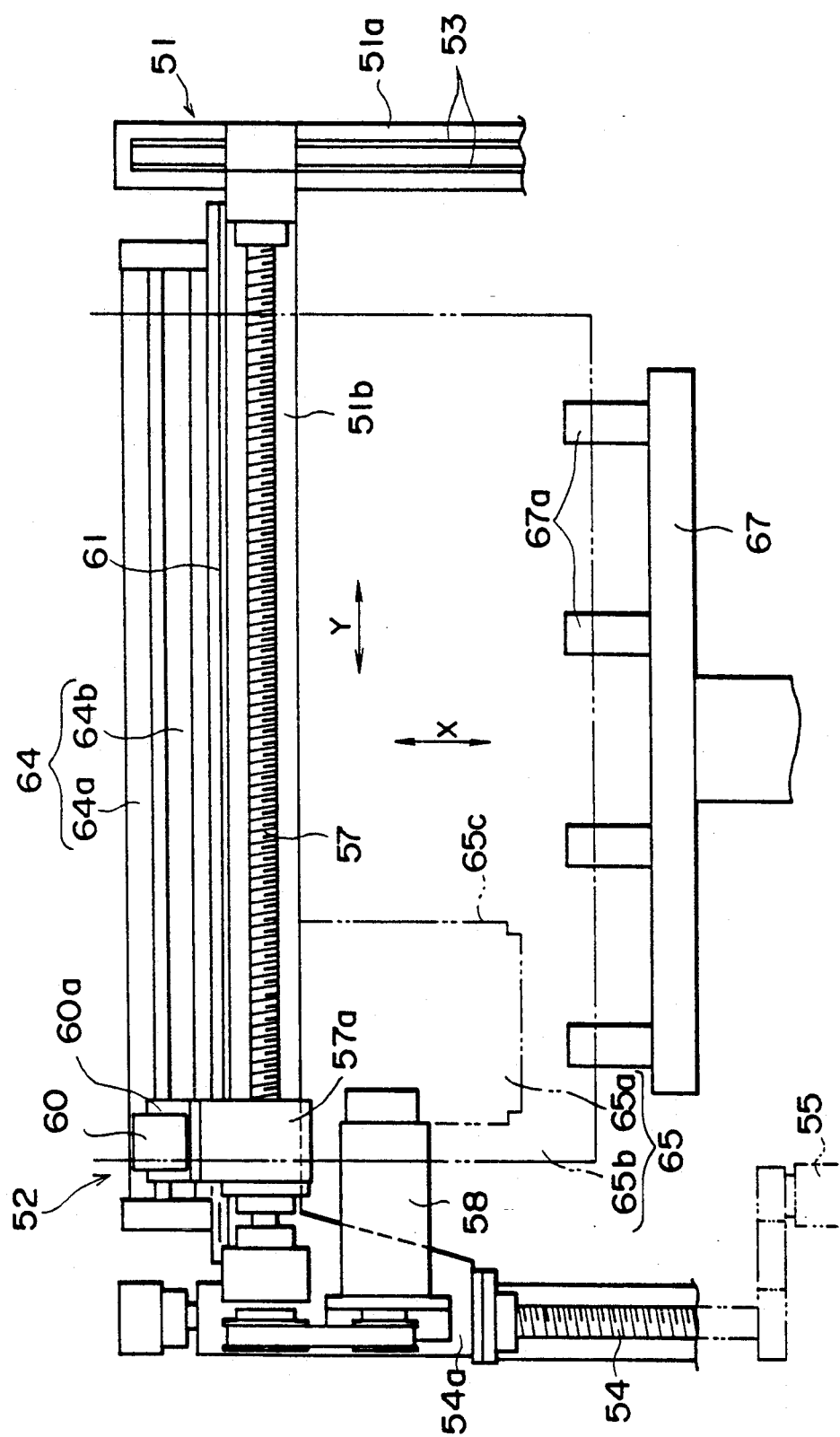
FIG. 11 is an enlarged top view of the apparatus of FIG. 10.
Figure 12:
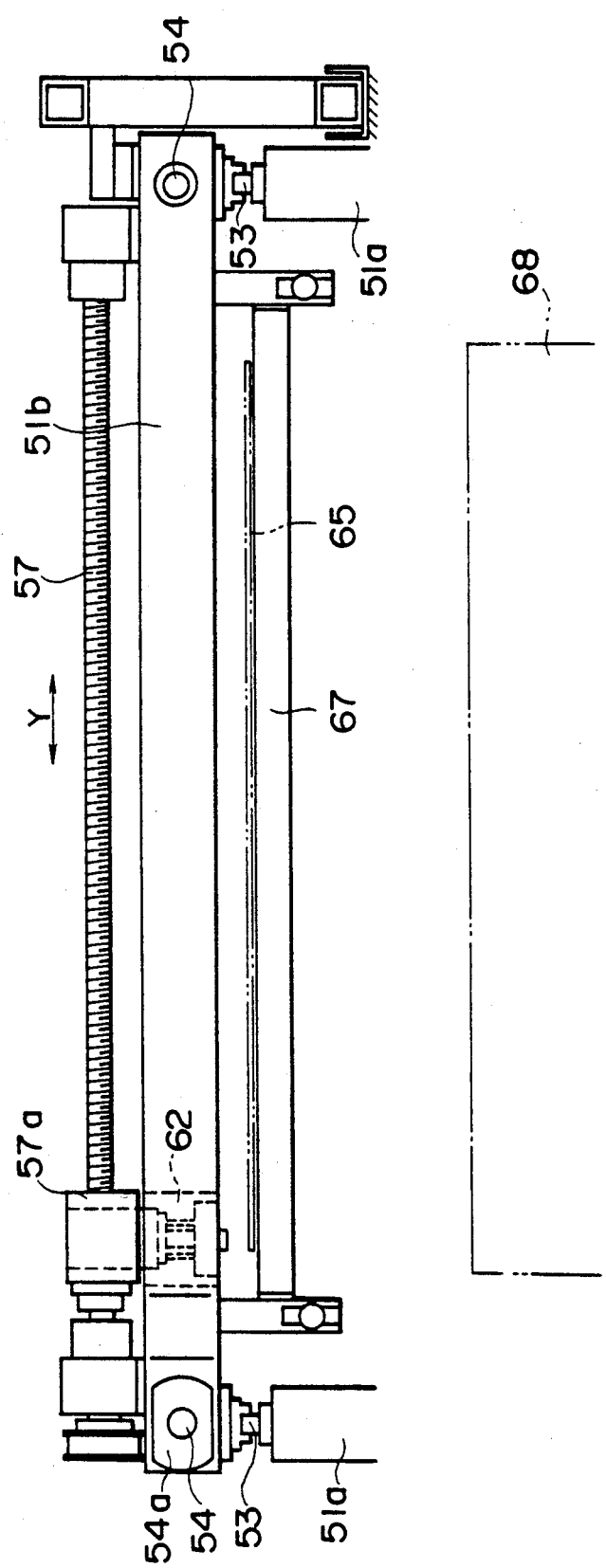
FIG. 12 is an enlarged side view of the apparatus of FIG. 10.

As shown in FIGS. 11 and 12, the sheet material, supply device 51 has a pair of spaced apart guide rails 53 positioned on a stand 51a on each side of the device 51, with the guide rails 53 extending parallel to each other and to the X-axial direction. A main beam 51b, which extends in the Y-axial direction, is moveably supported on the guide rails 53 so as to be movable in the X-axial direction. Ball thread shafts 54 are provided above the guide rails 53 and in parallel therewith. Ball nuts 54a, provided on both end portions of the main beam 51b, are threaded onto the ball thread shafts 54. By the use of X-axial driver motors 55 to rotate the ball thread shafts 54, the main beam 51b is moved in the X-axial direction along the guide rails 53.

A ball thread shaft 57 is positioned on the main beam 51b so as to extend in the Y-axial direction orthogonal to the ball thread shafts 54, such that ball thread shaft 57 can be rotated by a Y-axial motor 58 which is provided on one of the ball nuts 54a. A ball nut 57a is threaded onto the ball thread shaft 57 so that the ball nut 57a moves in the Y-axial direction upon the rotation of the ball thread shaft 57.

Figure 13:
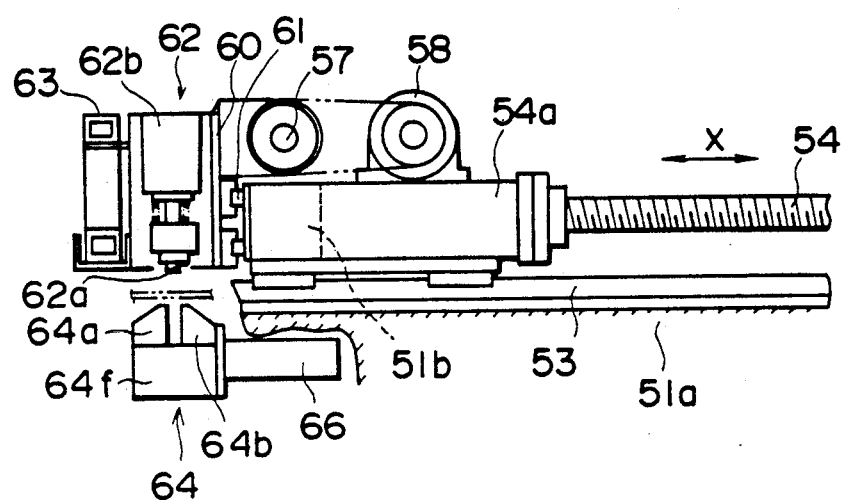
FIG. 13 is an enlarged view of the portion within circle B as shown in FIG. 10.

A punch unit support member 60 is connected to the ball nut 57a via the bracket 60a. As shown in FIG. 13, the punch unit support member 60 is moveably supported on a guide rail 61 which extends in the Y-axial direction on a side surface of the main beam 51b, so that punch unit support member 60 moves in the Y-axial direction with the displacement of the ball nut 57a. A punch unit 62, having a punch 62a and an air cylinder 62b for driving the punch 62a vertically or at least substantially parallel to the Z-axis direction, is attached to the punch unit support member 60. A cable bearer 63 moveably holds various cables for supplying power and air to the punch unit 62.

Figure 14:
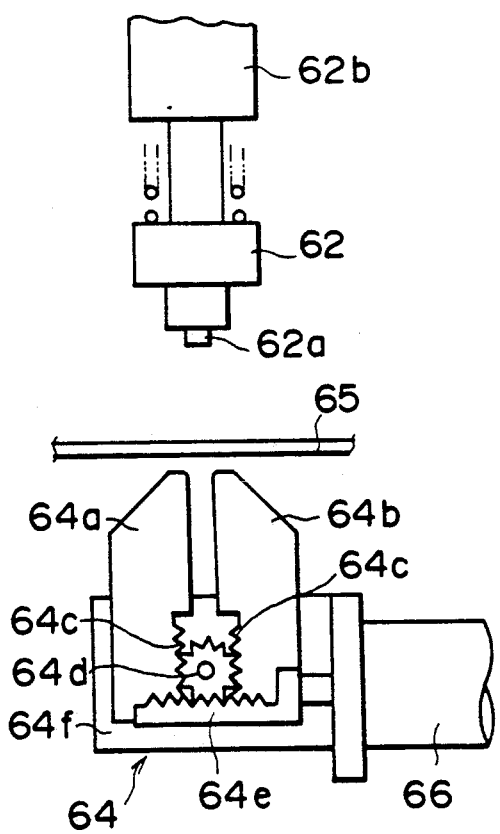
FIG. 14 is an enlarged view of a punch unit and a die unit.
Figure 15A:
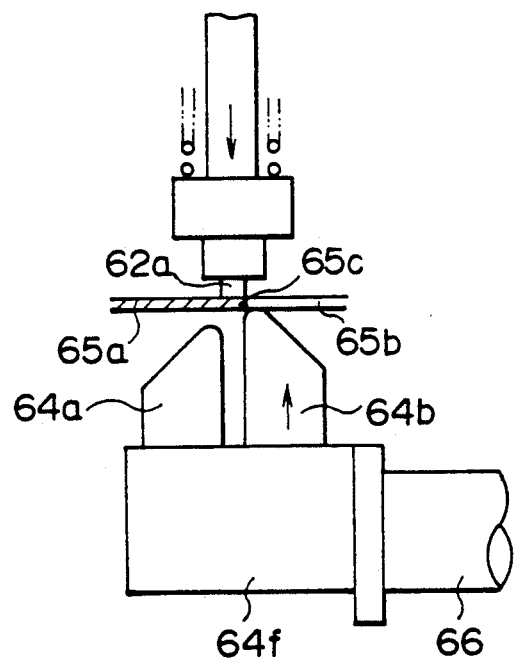
FIG. 15A and FIG. 15B show the separation operation with the third embodiment.
Figure 15B:
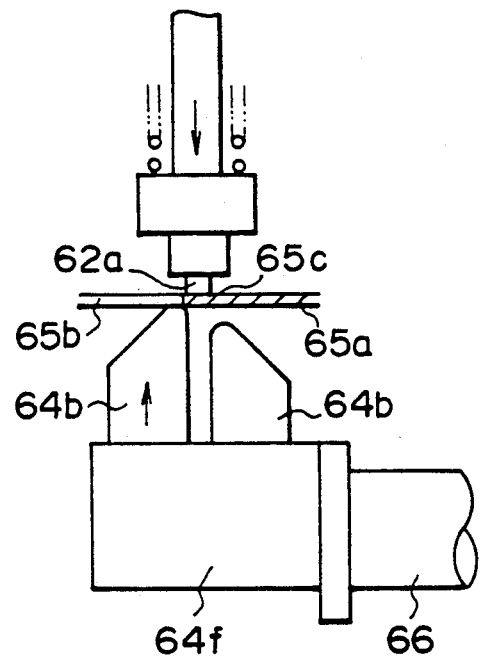

On the other hand, a die unit 64 cooperates with the punch unit 62 to separate an interval of the microjoint which is positioned adjacent thereto. The die unit 64 has a pair of dies 64a, 64b which project upwardly from a die holder 64f. These dies 64a, 64b extend almost the entire width of the apparatus in the Y-axial direction, and the outer or non-adjacent sides of their upper ends are collectively formed in the shape of an inverted "V" so that their terminal ends provide a reduced zone of contact with the workpiece 65. The dies 64a, 64b are positioned so that the terminal end of one die can supports a marginal portion of a product 65a from the bottom side thereof while the other die supports an adjacent portion of frame 65b of the workpiece 65 from the bottom side thereof. As shown in FIG. 14, racks 64c are formed in an opposing manner in the lower portions of the facing sides of the dies 64a, 64b, and pinons 64d are respectively meshed with the racks 64c. The pinions 64d can be rotated via a rack 64e by two die selection cylinders 66, each die selection cylinder 66 being provided at a respective end of the dies 64a, 64b. Thus, either one of the dies 64a, 64b can be selectively raised to the separating position, as shown in FIGS. 15A and 15B.

Figure 16:
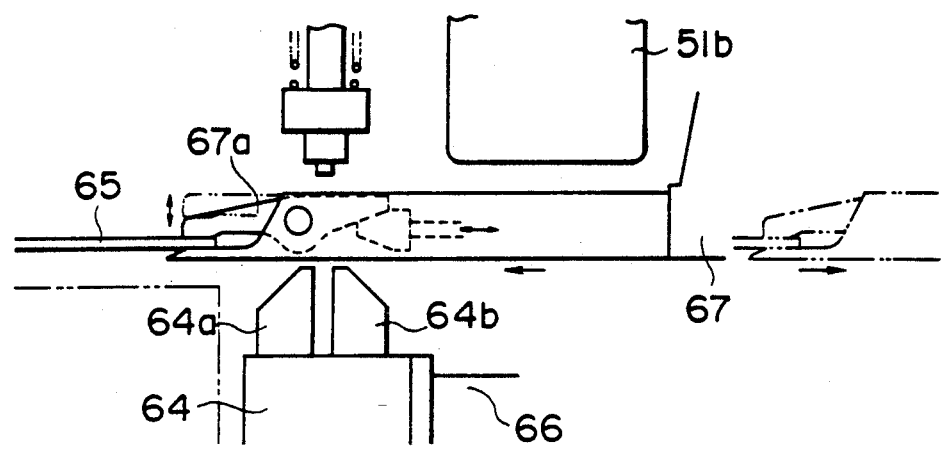
FIG. 16 illustrates the introduction of a workpiece in the apparatus of FIG. 10.
Figure 17:
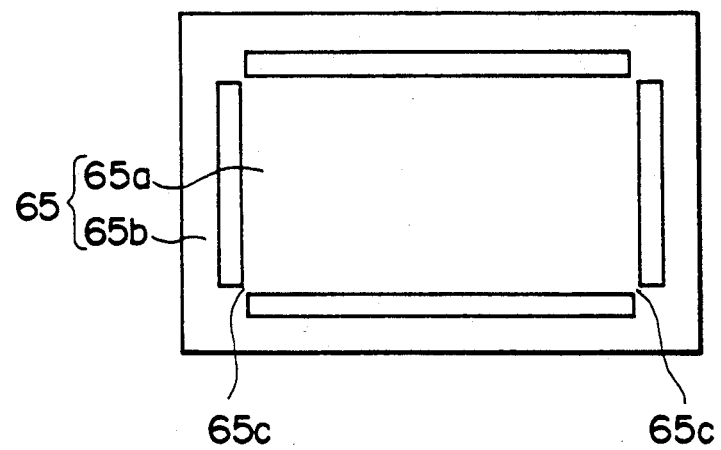
FIG. 17 is a top view of a workpiece having a frame and a product connected by microjoints.

The workpiece 65 to be separated along a microjoint is transported to a predetermined position in the X-axial direction as it is grasped by the grip 67a of a sheet material carrying device 67, as shown in FIG. 16. A storage unit 68 for accommodating the separated product 65a and frame 65b is provided at the lower portion of the sheet material supply device 51, as shown in FIG. 12. The storage unit 68 is constructed such that a product pallet (not shown) for storing the product 65a is positioned under the sheet material supply device 51 when a product 65a is being separated, and a frame pallet (not shown) for storing the frame 65b is positioned below the sheet material supply device 51 after all of the products 65a have been separated from the frame 65b, and then the grips 67a release the frame 65b onto the frame pallet. Thus a discrimination between a product 65a and the frame 65b, which will be a scrap, can be made and the products 65a can be collected separately from the frame 65b.

The operation of the third embodiment will now be described. When the workpiece 65, which has been processed with microjoints by the sheet metal working machine 50, is brought into the sheet material supply device 51, the main beam 51b is moved in the X-axial direction and the punch unit support member 60 is moved in the Y-axial direction in accordance with the previously inputted order of separation, in order to position the punch unit 62 at the separating position. One of the dies 64a, 64b is then raised, as shown in FIG. 15A or FIG. 15B, to the separating position by the die selection cylinders 66. Specifically, with reference to FIG. 15A, if the right side of the product 65a is to be struck by the punch 62a to separate the product 65a from the left side portion of the frame 65b along the adjacent segment of the connecting microjoint 65c, the right side die 64b is raised to support the frame 65b. Further, with reference to FIG. 15B, if the left side of the product 65a is to be struck to separate the product 65a from the right side portion of the frame 65b along the connecting microjoint 65c, the left side die 64a is raised to support the frame 65b.

Thus, by selecting one of the dies 64a, 64b, in this manner, a portion of the frame 65b of the workpiece 65 is supported from below while the adjacent portion of the product 65a is struck by punch 62a to separate the product 65a from the frame 65b along the microjoint 65c. The separated product 65a drops onto the product pallet which has been carried in by the storage unit 68. Further, when all the products 65a are separated from the frame 65b, they are carried out by the product pallet. Thereafter, the frame pallet is carried in and the frame 65b is placed on the frame pallet and carried to the outside of the sheet material supply device 51.

When a workpiece 65, processed with microjoints at the sheet metal working machine 50, is to be carried into the sheet material supply device 51, the dies 64a, 64b are lowered, as shown in FIG. 16, so that the grips 67a of the sheet material carrying device 67 do not interfere with the dies 64a, 64b.

According to the third embodiment, the microjoint separation apparatus 52 is provided on the sheet material supply device 51. Accordingly, it is not necessary to provide a separate space for installing the separation apparatus 52, whereby saving of space can be achieved. Further, since the separated product 65a and frame 65b can be discriminated from each other when they are collected, a large size sending-out device for discrimination is not required and it is possible to automate the process through the carrying in of the workpiece processed with microjoints, and the separation and discriminating collection of the product and the frame. Thus, a reduction of labor can also be achieved.

Reasonable variations and modifications are possible within the scope of the foregoing description, the drawings and the appended claims to the invention. For example, while the presently preferred embodiments have been illustrated with each of the X-axis and the Y-axis being in a horizontal plane, it is possible for either or both of the X-axis and the Y-axis to be inclined to the horizontal at an acute angle.

What is claimed is:

1. A microjoint separation apparatus for separating a workpiece into a product and a workpiece frame wherein the product is initially connected to the workpiece frame in the workpiece by at least one microjoint, said apparatus comprising:
   a main body having an upstream end and a downstream end aligned in an X-axial direction;
   moving means for moving said workpiece from said upstream end of the main body along said X-axial direction toward said downstream end of the main body;
   an impact imparting device for imparting an impact to said workpiece so as to break a microjoint connecting the product to the workpiece frame, said impact imparting device being provided on said main body above said workpiece and positionable along a Y-axial direction which is at least generally perpendicular to said X-axial direction;
   a positioning device for positioning an impacting point of the workpiece relative to said impact imparting device by causing said moving means to move the workpiece in said X-axial direction and by moving said impact imparting device in said Y-axial direction; and
   supporting means for supporting a lower portion of the workpiece, adjacent to the microjoint to be broken, when the workpiece is being impacted by said impact imparting device striking the workpiece in the vicinity of the microjoint to be broken so as to break that microjoint.

2. A microjoint separation apparatus in accordance with claim 1 wherein said positioning device comprises a numerical control device for positioning said impacting point of the workpiece by causing said moving means to move the workpiece in the X-axial direction and by moving said impact imparting device in said Y-axial direction.

3. A microjoint separation apparatus in accordance with claim 1 wherein said moving means comprises an upstream conveyor and a downstream conveyor.

4. A microjoint separation apparatus in accordance with claim 3 wherein said upstream conveyor is a first roller conveyor and wherein said downstream conveyor is a second roller conveyor.

5. A microjoint separation apparatus in accordance with claim 1 wherein said moving means comprises an upstream roller conveyor which extends in a first at least generally horizontal plane, and a downstream roller conveyor which extends in a second at least generally horizontal plane, with said second horizontal plane being lower than said first horizontal plane; and wherein said apparatus further comprises an elevator table positioned beneath said upstream roller conveyor and having a lowered position and an elevated position, a first plurality of bearings positioned on said elevator table for extending between the rollers of said upstream roller conveyor and supporting the workpiece when said elevator table is in its elevated position, a translation table having an extended position above said downstream roller conveyor and a retracted position away from said downstream roller conveyor, and a second plurality of bearings positioned on said translation table for supporting the workpiece when said translation table is in its extended position.

6. A microjoint separation apparatus in accordance with claim 5 wherein said first plurality of bearings and said second plurality of bearings are at least substantially coplanar when said elevator table is in its elevated position and said translation table is in its extended position.

7. A microjoint separation apparatus in accordance with claim 6 wherein said supporting mans comprises first and second cradles positioned between said upstream roller conveyor and said downstream roller conveyor, with said first and second cradles being spaced apart from each other in the X-axis direction and extending at least substantially parallel to each other in the Y-axis direction.

8. A microjoint separation apparatus in accordance with claim 1 wherein said supporting means comprises first and second dies spaced apart from each other in the X-axis direction and extending at least substantially parallel to each other in the Y-axis direction, and wherein said impact imparting device comprises a punch.

9. A microjoint separation apparatus for separating a workpiece into a product and a workpiece frame wherein the product is initially connected to the workpiece frame in the workpiece by at least one microjoint, said apparatus comprising:
 a main body having an upstream end and a downstream end aligned in an X-axial direction;
 moving means for moving said workpiece from said upstream end of the main body along said X-axial direction toward said downstream end of the main body;
 an impact imparting device provided on said main body above said workpiece and positionable along a Y-axial direction which is at least generally perpendicular to said X-axial direction;
 a positioning device for positioning an impacting point of the workpiece relative to said impact imparting device by causing said moving means to move the workpiece in said X-axial direction and by moving said impact imparting device in said Y-axial direction;
 supporting means for supporting a lower portion of the workpiece when the workpiece is being impacted by said impact imparting device; and
 a tapping device provided on said main body and positionable along said Y-axial direction;
 wherein said positioning device positions a tapping point of the workpiece by causing said moving means to move the workpiece in the X-axial direction and by moving said tapping device in the Y-axial direction.

10. A microjoint separation apparatus in accordance with claim 9, wherein said supporting means supports a lower portion of the workpiece when the workpiece is being tapped by said tapping device.

11. A microjoint separation apparatus in accordance with claim 9 wherein said positioning device comprises a numerical control device for positioning said impacting point of the workpiece by causing said moving means to move the workpiece in the X-axial direction and by moving said impact imparting device in said Y-axial direction, and for positioning said tapping point of the workpiece by causing said moving means to move the workpiece in the X-axial direction and by moving said tapping device in said Y-axial direction.

12. A microjoint separation apparatus in accordance with claim 11 wherein said moving means comprises an upstream conveyor and a downstream conveyor.

13. A microjoint separation apparatus in accordance with claim 12 wherein said upstream conveyor is a first roller conveyor and wherein said downstream conveyor is a second roller conveyor.

14. A microjoint separation apparatus in accordance with claim 9 wherein said moving means comprises an upstream roller conveyor which extends in a first at least generally horizontal plane, and a downstream roller conveyor which extends in a second at least generally horizontal plane, with said second horizontal plane being lower than said first horizontal plane; and wherein said apparatus further comprises an elevator table positioned beneath said upstream roller conveyor and having a lowered position and an elevated position, a first plurality of bearings positioned on said elevator gable for extending between the rollers of said upstream roller conveyor and supporting the workpiece when said elevator table is in its elevated position, a translation table having an extended position above said downstream roller conveyor and a retracted position along the Y-axial direction away from said downstream roller conveyor, and a second plurality of bearings positioned on said translation table for supporting the workpiece when said translation table is in its extended position.

15. A microjoint separation apparatus in accordance with claim 14 wherein said first plurality of bearings and said second plurality of bearings are at least substantially coplanar when said elevator table is in its elevated position and said translation table is in its extended position.

16. A microjoint separation apparatus in accordance with claim 15 wherein said supporting means comprises first and second cradles positioned between said upstream roller conveyor and said downstream roller conveyor, with said first and second cradles being spaced apart from each other in the X-axis direction and extending at least substantially parallel to each other in the Y-axis direction.

17. A microjoint separation apparatus in accordance with claim 9 wherein said supporting means comprises first and second dies spaced apart form each other in the X-axis direction and extending at least substantially parallel to each other in the Y-axis direction, and wherein said impact imparting device comprises a punch.

18. A microjoint separation apparatus for separating a workpiece into a product and a workpiece frame wherein the product is initially connected to the workpiece frame in the workpiece by at least one microjoint, said apparatus comprising:
- a main body having an upstream end and a downstream end aligned in an X-axial direction;
- moving means for moving said workpiece from said upstream end of said body along said X-axial direction toward said downstream end of the main body;
- an impact imparting device for imparting an impact to said workpiece so as to break a microjoint connecting the product to the workpiece frame, said impact imparting device being provided on said main body, said impact imparting device being positionable along a Y-axial direction which is at least generally perpendicular to said X-axial direction, said impact imparting device being capable of applying an impact force to said workpiece along a Z-axial direction which is at least generally perpendicular to said X-axial direction and said Y-axial direction;
- a positioning device for providing positioning of said impact imparting device with respect to an impact receiving point of the workpiece by moving said impact imparting device in a Y-axial direction; and
- a pair of supporting means positioned below said workpiece and extending parallel to each other in a Y-axial direction, each of said pair of supporting means having an elevated position for supporting from below a portion of the workpiece, adjacent to the microjoint to be broken, when the workpiece is being impacted by said impact imparting device striking the workpiece in the vicinity of the microjoint to be broken so as to break that microjoint, and a lowered position out of contact with the workpiece, and means for selectively raising at least one of said pair of supporting means to its elevated position when the workpiece is to be impacted by said impact imparting device.

19. A microjoint separation apparatus in accordance with claim 18 wherein said pair of supporting means comprises first and second dies spaced apart from each other in the X-axis direction and extending at least substantially parallel to each other in the Y-axis direction, and wherein said impact imparting device comprises a punch.

20. A microjoint separation apparatus in accordance with claim 18, further comprising a storage unit provided below said impact imparting device, for first collecting product separated from the workpiece frame and then for separately collecting the workpiece frame.

21. A microjoint separation apparatus in accordance with claim 18, wherein said moving means comprises a main beam provided on a sheet material supply device for carrying a workpiece from a sheet metal working machine and for carrying said workpiece to said sheet metal working machine, said main beam being movable in the X-axial direction;
- wherein said impact imparting device comprises a punch unit provided on the main beam, said punch unit being positionable in said Y-axial direction; and
- wherein said pair of supporting means comprises a pair of dies provided in parallel to each other and to the Y-axial direction below the punch unit, each of said pair of dies being selectively movable in a vertical direction by a selection cylinder in accordance with the position of the product to be separated.

* * * * *

UNITED STATES PATENT AND TRADEMARK OFFICE
CERTIFICATE OF CORRECTION

PATENT NO. : 5,259,107
DATED : November 9, 1993
INVENTOR(S) : Toshiyuki TANABE et al It is certified that error appears in the above-indentified patent and that said Letters Patent is hereby corrected as shown below:

Column 11, line 26, change "mans" to --means--.

Column 12, line 36, change "gable" to --table--.

Signed and Sealed this

Nineteenth Day of April, 1994

Attest:

BRUCE LEHMAN

*Attesting Officer*  *Commissioner of Patents and Trademarks*